UNITED STATES PATENT OFFICE.

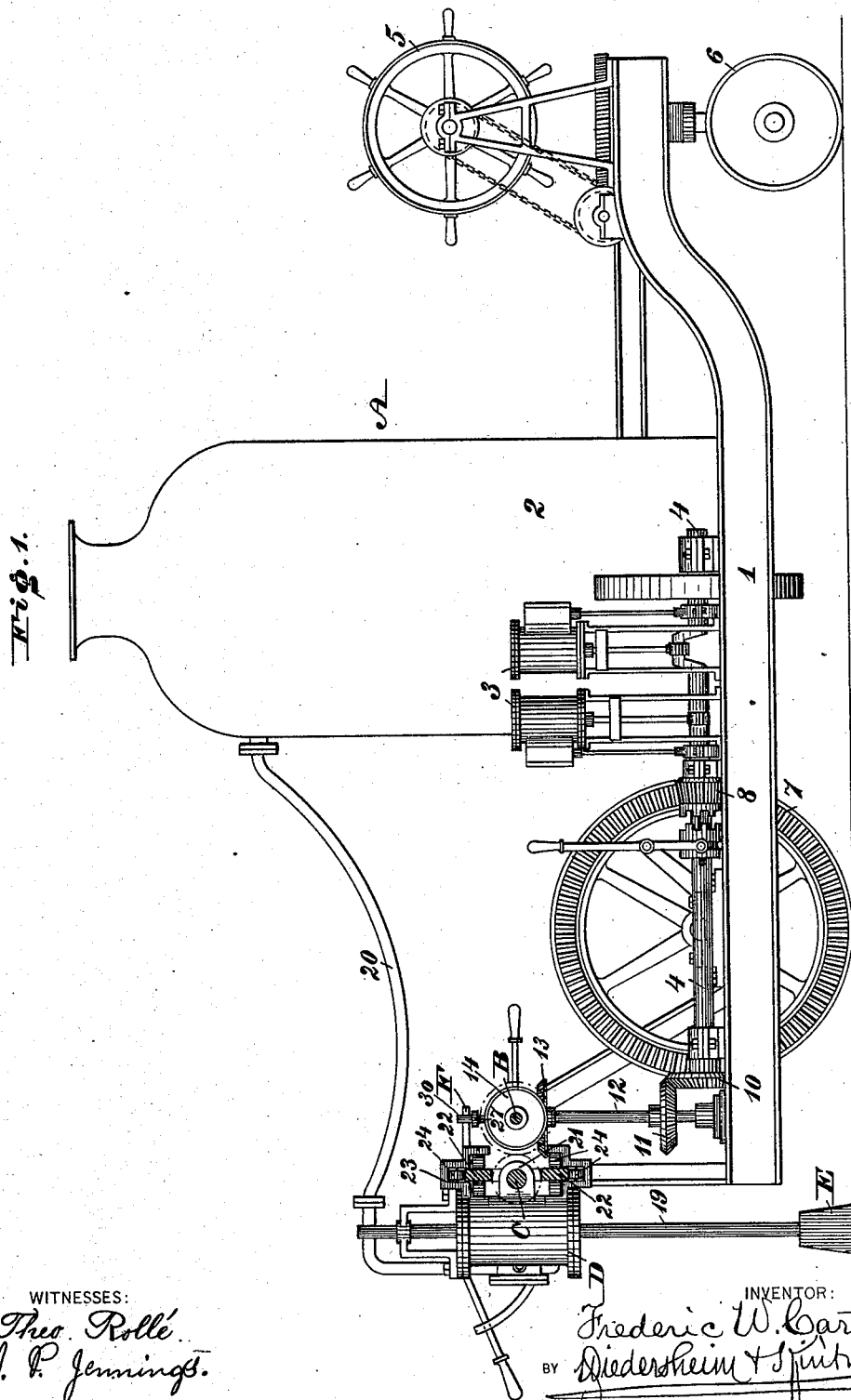

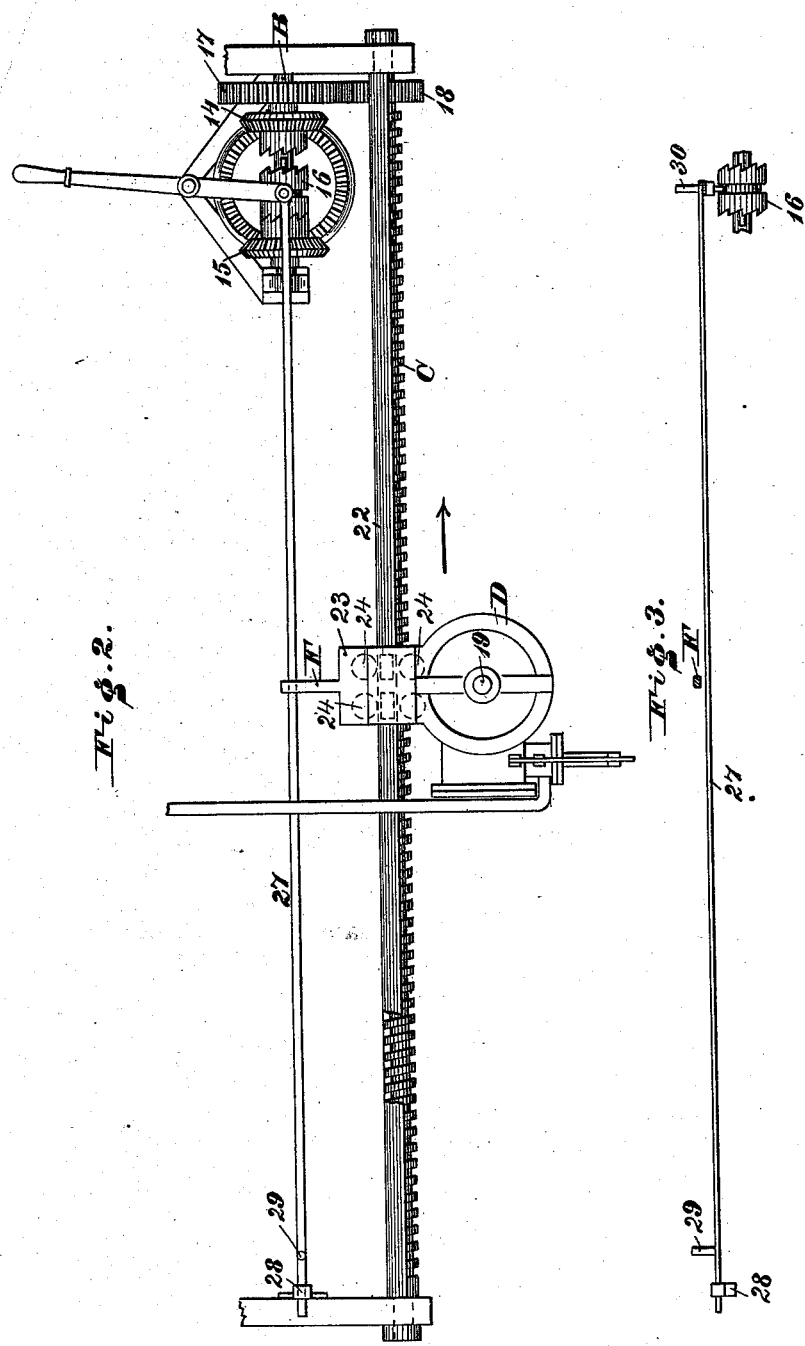

FREDERIC W. CARTER, OF CAMDEN, NEW JERSEY, ASSIGNOR TO THE AMERICAN STEAM PAVING COMPANY, OF NEW JERSEY.

STEAM ROAD-RAMMER.

SPECIFICATION forming part of Letters Patent No. 402,063, dated April 23, 1889.

Application filed July 24, 1888. Serial No. 280,889. (No model.)

*To all whom it may concern:*

Be it known that I, FREDERIC W. CARTER, a citizen of the United States, residing in the city and county of Camden, State of New Jersey, have invented a new and useful Improvement in Steam Road-Rammers, which improvement is fully set forth in the following specification and accompanying drawings.

My invention consists of an apparatus for ramming stones of streets, roads, &c., embodying novel features, as will be hereinafter fully set forth.

Figure 1 represents a partial side elevation and partial vertical section of a steam-rammer embodying my invention. Fig. 2 represents a top or plan view of a portion thereof on an enlarged scale. Fig. 3 represents a rear view of a portion shown in Fig. 2.

Similar letters and numerals of reference indicate corresponding parts in the several figures.

Referring to the drawings, A represents what is generally known as a "road-steamer," consisting of a frame, 1, carrying a boiler, 2, engines 3, driving-shaft 4, and steering apparatus 5, said frame being mounted on rollers 6 and 7, the rollers 7 meshing with a pinion and clutch, 8, which is loosely fitted on the driving-shaft 4, and caused to receive motion therefrom by means of a clutch on said shaft, it being evident that said roller and shaft may be thrown into and out of gear, as desired. To the rear end of the shaft is keyed or otherwise secured a bevel-wheel, 10, which meshes with a bevel-wheel, 11, the latter being mounted on an upright shaft, 12, which is supported on the frame 1. The upper end of said shaft carries a bevel-wheel, 13, with which mesh two wheels, 14 15, the same being located opposite to each other and fitted loosely on a horizontal shaft, B, each wheel having portions of a clutch on the inner side thereof, so as to be engaged by the clutch 16 proper, it being evident that said clutch 16 may be moved to the right or left and thus cause the shaft B to rotate in reverse directions.

To the shaft B is secured a spur-wheel, 17, which gears with a pinion, 18, the latter being secured to a screw, C, which is arranged transversely and horizontally at the rear of the apparatus, the shaft B and screw C being properly supported on the frame 1.

D represents a steam-cylinder which contains a piston, the stem 19 of which carries a rammer, E, said cylinder having its steam-chest connected with the boiler 2 by means of a flexible pipe, 20, and operating after the manner of a steam-hammer, so that the rammer E may be raised and forcibly lowered and thus operate on the surface to be rammed, it being seen that the cylinder D is provided with an ear, 21, which is internally threaded and has the screw C passed through the same, so that as said screw is rotated lateral motion may be imparted to the cylinder D and connected parts, whereby the rammer moves across the street, road, &c., over the stones to be rammed, the same imparting blows to the said stones, as is evident. The cylinder is supported on rails or beams 22 by means of plates 23, which are secured to the cylinder and carry rollers 24, which ride on the faces and sides of said rails, so that the cylinder moves easily and is firmly sustained on the rails without liability of jumping the same, said rails being properly supported on the frame 1.

The clutch 16 is formed with a neck, 25, in which freely enters a pin or stud, 26, depending from one end of a sliding rod, 27, the opposite end whereof is freely fitted in a guide, 28, supported on the frame 1. Rising from opposite ends of said rod 27 are pins or studs 29 30, which are adapted to be engaged by a finger, F, which projects horizontally forward from the cylinder D, so that when the latter has about traversed the length of the screw C the finger strikes the respective stud 29 or 30, causing the movement of the rod 27 and consequent shifting of the clutch 16, whereby the motion of the shaft B is reversed, thus causing the reverse rotation of the screw C, so that motion in opposite directions is automatically imparted to the steam-cylinder, and consequently to the rammer carried by the same.

It will be seen that when power is applied to the shaft 4 the screw C is operated, whereby right and lateral motions are imparted to the cylinder and hammer, and owing to the clutch 16 and connected parts said motions are from end to end of the screw at a right line to the shaft of the carriage or vehicle, the rammer rising and falling, as has been stated, and driving the stone, as is evident.

When the machine is run backward, the roller 7 serves to roll the rammed work, thus finishing the same.

Having thus described my invention, what I claim as new, and desire to secure by Letters Patent, is—

1. In a steam-rammer, the combination of a frame with a rotary longitudinal shaft journaled therein, a vertical shaft connected by gearing with said longitudinal shaft, a cylinder with steam-hammer, and an internally-screw-threaded ear, a screw connected by gearing with said vertical shaft and carrying said ear of cylinder, and a lateral guideway for said cylinder, substantially as described.

2. In a steam-rammer, the vertical rotary shaft 12, with bevel gear-wheel on its upper end, the horizontal shaft B, with bevel-wheels 14 and 15, gearing with bevel-wheel on upper end of vertical shaft 12, the clutch 16 on said shaft B, the screw C, carrying pinion 18, gearing with a pinion, 17, on shaft B, and a cylinder with steam-hammer and the ear 21, the latter internally screw-threaded and working on the screw C, said parts being combined substantially as described.

3. In a steam-rammer, the beams 22, in combination with a cylinder having a steam-hammer and the ear 21 internally screw-threaded, and plate guided on said beams, and a rotary screw on which said ear works, substantially as and for the purpose set forth.

4. In a steam-rammer, a cylinder with a steam-hammer, and the plates 23, the transverse beams 22, the rollers 24, the ear 21, internally screw-threaded, and the rotary screw C, said parts being combined substantially as and for the purpose set forth.

5. In a steam-rammer, the combination, with a frame, of a rotary shaft journaled therein, an upright shaft connected by gearing to said longitudinal shaft and carrying a bevel-wheel, the shaft B, with bevel-wheels 14 and 15 loosely mounted thereon and gearing with the bevel-wheel on the upright shaft, and the pinion 17, a clutch adapted to connect either of said wheels 14 and 15 rotatably with said shaft B, an operating-rod for said clutch having the lugs 29 and 30, the screw C, carrying pinion 18, meshing with the pinion 17, a cylinder with hammer, the said cylinder having an ear internally screw-threaded and working on said screw, and a plate connected to the cylinder and guided on cross-beams secured to the frame of the machine, and having the finger F, substantially as described.

6. In a steam-rammer, the vertical shaft 12, with bevel-gear thereon, the shaft B, with bevel-gears 14 and 15 and pinion 17, the clutch 16 on said shaft B, the screw C, with pinion 18 meshing with said pinion 17, a cylinder with ear 21 internally screw-threaded, and the plate 23, having the finger F, and the clutch-operating rod 27, with studs 29 and 30, said parts being combined substantially as described.

F. W. CARTER.

Witnesses:
JOHN A. WIEDERSHEIM,
A. P. JENNINGS.